United States Patent [19]

Klemmensen et al.

[11] Patent Number: 5,005,625
[45] Date of Patent: Apr. 9, 1991

[54] PNEUMATIC TIRE HAVING AIR RETENTION INNERLINER

[75] Inventors: Daniel F. Klemmensen, Tallmadge; Roger N. Beers, Uniontown, both of Ohio

[73] Assignee: The Goodyear Tire & Rubber Company, Akron, Ohio

[21] Appl. No.: 343,776

[22] Filed: Apr. 24, 1989

[51] Int. Cl.$^5$ ........................ B60C 5/14; B32B 27/28
[52] U.S. Cl. ........................... 152/510; 152/DIG. 16; 428/423.9
[58] Field of Search ............... 152/510, 511, DIG. 16, 152/504, 505; 428/423.9

[56] References Cited

U.S. PATENT DOCUMENTS 4,725,649 2/1988 Hoshino ........................ 152/510
4,874,670 10/1989 Boon et al. ................... 428/423.9

FOREIGN PATENT DOCUMENTS 57-87702 6/1982 Japan ........................... 152/510

Primary Examiner—Caleb Weston
Assistant Examiner—Gregory J. Wilber
Attorney, Agent, or Firm—Henry C. Young, Jr.

[57] ABSTRACT

A pneumatic rubber tire having an integral innerliner of a sulfur cured rubber composition comprised of an acrylonitrile/diene copolymer rubber with specified Tg range and at least one designated additional rubber having a Tg of a specified range.

5 Claims, No Drawings

PNEUMATIC TIRE HAVING AIR RETENTION INNERLINER

FIELD

This invention relates to a pneumatic tire having an air retention innerliner.

BACKGROUND

The inner surface of pneumatic rubber tires is typically comprised of an elastomeric composition designed to prevent or retard the permeation of air and moisture into the carcass from the tire's inner air chamber. It is often referred to as an innerliner. Innerliners have also been used for many years in tubeless pneumatic vehicle tires to retard or prevent the escape of air used to inflate the tire, thereby maintaining tire pressure. Rubbers which are relatively impermeable to air are often used as a major portion of said innerliners and can include butyl rubber and halobutyl rubbers. U.S. Pat. No. 3,808,177 discloses other polymers which may also be relatively impermeable. It is known that acrylonitrile/butadiene copolymers can be relatively impermeable.

The innerliner is normally prepared by conventional calendering or milling techniques to form a strip of uncured compounded rubber of an appropriate width, which is sometimes referred to as a gum strip. Typically, the gum strip is the first element of the tire to be applied to a tire building drum, over and around which the remainder of the tire is built. When the tire is cured, such innerliner becomes an integral, co-cured, part of the tire. Tire innerliners and methods of preparation are well known to those having skill in such art.

The preparation of a gum strip composed entirely of compounded chlorobutyl or bromobutyl rubber has been observed to have some processing and fabrication problems such as sticking to processing equipment during the milling and calendering operations.

Furthermore, it has sometimes been desired to provide a gum strip composition for the innerliner which has suitable processing properties, building tack in its uncured state and cured adhesion to the tire carcass while also having a satisfactory degree of air impermeability.

DISCLOSURE AND PRACTICE OF INVENTION

In accordance with this invention, a pneumatic rubber tire is provided having an integral innerliner of a sulfur cured rubber composition comprised of, based on 100 parts by weight rubber, a blend of (A) about 20 to about 90 parts by weight acrylonitrile/diene copolymer rubber having a Tg (glass transition temperature) in the range of about 10° C. to about −25° C., preferably about 0° C. to about −15° C.; and (B) about 80 to about 10 parts by weight of at least one additional rubber having a Tg in the range of about −40° C. to about −105° C. comprising at least one of cis 1,4-polyisoprene rubber (natural or synthetic), styrene/butadiene copolymer rubber, polybutadiene rubber, styrene/isoprene/butadiene rubber, butyl rubber and halobutyl rubber.

The acrylonitrile/diene copolymer is intended to include acrylonitrile/butadiene and acrylonitrile/isoprene copolymers, although the preferred rubber is an acrylonitrile/butadiene copolymer. The polybutadiene rubber is intended to include cis 1,4-polybutadiene and medium vinyl polybutadiene rubbers, although it is preferably cis 1,4-polybutadiene rubber. The cis 1,4-polyisoprene rubber is preferably natural rubber. Such rubbers are well known.

Preferably, the halobutyl rubber is at least one of chlorobutyl and bromobutyl rubber. Such rubbers are well known.

A basic requirement of said additional rubber is for it to have a Tg of −40° C. or less, or, in other words, a maximum Tg of −40° C.

In the practice of this invention, preferably in such blend where said additional rubber is comprised of at least one of cis 1,4-polyisoprene rubber, styrene/butadiene rubber, styrene/isoprene/butadiene rubber, the resulting acrylonitrile content in the rubber blend is in the range of about 20 to about 40 weight percent (based on the rubbers of the rubber blend).

In the practice of this invention, preferably in such blend where said additional rubber is comprised of at least one of butyl, chlorobutyl and bromobutyl rubber, the resulting acrylonitrile content in the rubber blend is in the range of about 5 to about 25 weight percent (based on the rubbers of the rubber blend).

In practice, the innerliner composition is first prepared as an uncured compounded rubber gum strip, constructed as an inner surface (exposed inside surface) of an uncured rubber tire structure, (carcass), and sulfur co-cured with the tire carcass during the tire curing operation under conditions of heat and pressure. Thus, the innerliner becomes an integral part of the tire by being co-cured therewith as compared to being a simple adherent laminate.

It is to be understood that the prescribed innerliner rubbers can be compounded with conventional rubber compounding ingredients comprised of, for example, carbon black, clay, talc, mica, silica, zinc oxide, stearic acid, rubber processing oil, sulfur, accelerator and antidegradant and then typically extruded and/or calendered to form the uncured gum strip. Such rubber compounding materials and methods are well known to those having skill in such art.

A particularly desirable feature of such acrylonitrile/butadiene copolymer is its relatively impermeability to air transmission and, thus, its suitability as an air barrier for a tire innerliner. However, such rubber is not normally readily thought of for such purpose because of its relatively high green strength, making its processability and tire building ability more difficult then other rubbers and, also, its relatively high stiffness property, making it considerably less compatible than other rubbers for a tire innerliner environment.

While a commercial acrylonitrile/butadiene copolymer rubber typically has a Tg in the range of about −20° C. to about −40° C., although such copolymers can have higher or lower Tgs, it is desired that such copolymer for application to this invention have a Tg in the range of about 20° C. to about −40° C., preferably about 20° C. to about −25° C., and thus, a preferable range which is apparently somewhat higher than a typical Tg range of the bulk of commercially prepared acrylonitrile/butadiene rubbers, so that when it is blended with the additional rubber the resultant acrylonitrile content is at a sufficient level to enable the blend to provide a suitable air impermeability while also having a suitable compatibility with the tire carcass to be useful as a tire innerliner candidate.

The acrylonitrile/butadiene copolymer rubber for this invention has an acrylonitrile/butadiene ratio in the range of about 55/45 to about 20/80, preferably about 55/45 to about 30/70, and a Mooney viscosity (ML-40)

in the range of about 20 to about 90, preferably about 25 to about 50. It is typically prepared by emulsion polymerization.

An important feature of this invention is that the acrylonitrile/diene copolymer blend can have satisfactory air impermeability while maintaining other desirable physical properties when the acrylonitrile/butadiene copolymer is blended with other polymers having glass transition temperatures below −40C.; such as, for example, natural rubber, styrene/butadiene copolymer rubber, cis 1,4-polybutadiene rubber, butyl rubber, bromobutyl rubber and chlorobutyl rubber. The enhanced properties of such blend can include adhesion to non-nitrile rubber compounds, flex life, and the low temperature brittle point for the cured blend. An improvement in some property(ies) has been observed even if the actual nitrile content is substantially equivalent in both the individual acrylonitrile/diene rubber and the blend of rubbers, thus, the blend of rubbers may be preferred over a rubber compound containing only the acrylonitrile/butadiene rubber. Examples of such observations are shown in Table 1 of the Example included herein.

The uncured tire carcass rubber interface with which the innerliner is sulfur co-cured can be of various sulfur curable rubber and rubber blends such as, for example, polybutadiene, polyisoprene and styrene/butadiene copolymer rubbers.

Typically the innerliner has an uncured gum thickness in the range of about 0.03 to about 0.08 inch (0.08-0.2 cm), depending somewhat on the tire size, its intended use and degree of air retention desired.

The pneumatic tire with the integral innerliner composition may be constructed in the form of a passenger tire, truck tire, or other type of bias or radial pneumatic tire.

The following examples are presented to demonstrate the invention. The parts and percentages are by weight unless otherwise noted.

EXAMPLE I

Samples of acrylonitrile rubber (control Experiment No. 1) and blends of acrylonitrile rubber with other rubbers (Experiments 2–12), namely, natural rubber, butadiene/styrene rubber, polybutadiene rubber and bromobutyl rubber, were prepared and tested as shown in Tables 1 and 2.

The Experiment No. 1 control compound was prepared as based on a single copolymer of acrylonitrile/butadiene having an acrylonitrile/butadiene ratio of 33/67, and the Experiment No. 2 was prepared with a 70/30 ratio blend of acrylonitrile/butadiene copolymer rubber having an acrylonitrile/butadiene ratio of 45/55 and a styrene/butadiene rubber having a styrene/butadiene ratio of 23.5/76.5 to provide a final acrylonitrile content of 31.5 percent in the blend. With the acrylonitrile concentrations being approximately equal in both Experiments No. 1 and No. 2, it can readily be observed that the blend of polymers in Experiment No. 2 resulted in a desirably lower brittle point temperature, much improved flex life, and better adhesion to the carcass compound (70/30 natural rubber/styrene butadiene copolymer rubber) while having comparable air permeability values.

Experiments Nos. 3 through 6 show the results of blends of other elastomers with an acrylonitrile/butadiene copolymer. They illustrate improved flex life over the control (Experiment No. 1), and the solution styrene/butadiene blend of Experiment No. 4 showed an advantage over all the others for adhesion to the carcass compound.

The last four blends (Experiments Nos. 3-6) in the Table 1 demonstrate improved air permeability over the first two blends (Experiments Nos. 1 and 2) primarily because the level of Plasticizer SC, a triglycolester of a vegetable fatty acid, was reduced from 15 to 5 parts by weight.

The materials were mixed as a two-step mixing process by a size BR Banbury blender in which all of the ingredients were mixed in the first step except for sulfur, accelerators and zinc oxide which were added and mixed in the second step.

Experiments Nos. 7-12 are shown in Table 2. Experiment 7 is a Control where the rubber is a bromobutyl rubber.

Experiments Nos. 8-12 are blends of acrylonitrile/butadiene rubbers with the bromobutyl rubber and demonstrate that in a blend of bromobutyl rubber with acrylonitrile/butadiene rubber having an acrylonitrile content of 43%, the air permeability was lower (better) than the Control. This is considered predictive of results which would be expected for a tire innerliner with better air retention and thus, also, a potential for preparation of an innerliner of reduced thickness (thus, a potential for reduced weight and cost per tire).

The example further demonstrates that the permeability value of the Control could be substantially maintained or retained while, for the blend, the modulus of the cured rubber was enhanced.

The rubber compounds for Experiments 1-6 (Table 1) were prepared with 4.1 parts zinc oxide, 1.2 parts accelerator(s) and 1.5 parts sulfur, tackifier resin (1.4 parts for Experiments 1 and 2; 2 parts for Experiments 3-6, 5 parts coumarone-indene resin, 1 part oleic acid, 1 part antioxidant, polyglycolester plasticizer (15 parts for Experiments 1 and 2; 5 parts for Experiments 3-6.

The rubber compounds for Experiments 7-12 (Table 2) were compounded with dibutylphthalate (5 parts—Experiment 9); rosin oil (2 parts for Experiments 7 and 11, 4 parts for Experiments 8 and 10, 3 parts for Experiment 9 and 1.5 parts for Experiment 12); processing oil (3 parts for Experiments 7 and 12, and 2 parts for Experiment 11); phenolic tackifier (2 parts for Experiments 7, 8, 9 and 10, 1.5 parts for Experiments 11 and 12); processing aid (10 parts for Experiments 7 and 12, 7 parts for Experiment 11 and 4 parts for Experiments 8, 9 and 10); stearic acid (0.5 parts for Experiments 7 and 12); oleic acid (0.5 parts for Experiments 8, 9, 10 and 11); antioxidant (2 parts for Experiments 8 and 10, 1.5 parts for Experiment 9 and 1 part for Experiment 11); accelerator(s) (1.5 parts for Experiments 7, 9 and 12; 1.4 parts for Experiment 11 and 1.1 for Experiments 8 and 10); zinc oxide (1 part for Experiment 7; 1.5 part for Experiment 12; 3 parts for Experiments 9 and 11; 3.5 parts for Experiments 8 and 10) and sulfur (0.5 parts for Experiments 7, 9 and 11; 0.8 parts for Experiment 12 and 1.3 parts for Experiments 8 and 10).

The physical tests were conducted on the cured samples (best cure—18 minutes at 150° C.) using conventional methods.

TABLE 1

| | Control Exp No. 1 | Exp No. 2 | Exp No. 3 | Exp No. 4 | Exp No. 5 | Exp No. 6 |
|---|---|---|---|---|---|---|
| Material | | | | | | |
| Acrylonitrile/Butadiene Rubber (33%) | 100 | — | — | — | — | — |
| Acrylonitrile/Butadiene Rubber (45%) | — | 70 | 72 | 75 | 75 | 85 |
| Natural Rubber | — | — | — | — | 25 | — |
| Butadiene/Styrene Rubber(e) | — | 30 | 28 | — | — | — |
| Butadiene/Styrene Rubber(s) | — | — | — | 25 | — | — |
| Cis 1,4-Polyisoprene Rubber | — | — | — | — | — | 15 |
| Carbon Black | 50 | 50 | 45 | 45 | 45 | 45 |
| Silica | — | — | 7 | 7 | 7 | 7 |
| Properties | | | | | | |
| Modulus (300%) (MPa) | 5.4 | 6.4 | 12.8 | 12.2 | 10.7 | 13.1 |
| Elongation (%) | 513 | 481 | 370 | 365 | 437 | 371 |
| Strebler Adhesion (self/carcass) (N/0.5 cm) | 23.5/0 | 13.8/3.7 | 15.6/3.3 | 17.7/26.7 | 11.4/1.7 | 14.3/3.1 |
| Dematta Flex (95° C.) (crack growth; cm/min) | 2.5/5 | 1.0/240 | 0.2/240 | 1.1/240 | 0.5/240 | 0.3/240 |
| Air Permeability (cc-mil)/(100 in.$^2$ day · atm) | 210 | 208 | 106 | 88 | 77 | 114 |
| Brittle Point (°C.) ASTM D746 | −32 | −40 | −32 | −42 | −26 | −30 |

TABLE 2

| | Control Exp No. 7 | Exp No. 8 | Exp No. 9 | Exp No 10 | Exp No 11 | Exp No 12 |
|---|---|---|---|---|---|---|
| Material | | | | | | |
| Acrylonitrile/Butadiene Rubber (43%) | — | 40 | 30 | — | — | — |
| Acrylonitrile/Butadiene Rubber (33%) | — | — | — | 50 | 30 | 20 |
| Bromobutyl Rubber | 100 | 60 | 70 | 50 | 70 | 80 |
| Carbon Black | 50 | 45 | 45 | 45 | 50 | 50 |
| Properties | | | | | | |
| Modulus (300%) (MPa) | 2.5 | 5.1 | 5.6 | 8.3 | 7.1 | 5.6 |
| Elongation (%) | 899 | 499 | 508 | 374 | 432 | 480 |
| Strebler Adhesion (to self) (N/0.5 cm) | 133 | 17.8 | 31.2 | 26 | 38.9 | 66.7 |
| Air Permeability (cc-mil)/(100 in.$^2$/day · atm) | 100 | 72 | 81 | 115 | 109 | 105 |
| Brittle Point (°C.) ASTM D746 | −37 | −32 | −36 | −39 | −39 | −41 |

What is claimed is:

1. A pneumatic rubber tire having an integral innerliner of a sulfur cured rubber composition comprised of, based on 100 parts by weight rubber, a blend of (A) about 20 to about 90 parts by weight acrylonitrile/butadiene copolymer rubber with an acrylonitrile/butadiene ratio in the range of about 55/45 to about 20/80 and having a Tg in the range of about 20° C. to about −25° C.; and (B) about 80 to about 10 parts by weight of at least one additional rubber having a Tg in the range of about −40° C. to about −105° C. comprised of (i) at least one rubber selected from the group consisting of cis 1,4-polyisoprene rubber, styrene/butadiene copolymer rubber, cis 1,4-polybutadiene rubber, and styrene/isoprene/butadiene rubber or of (ii) at least one rubber selected from the group consisting of butyl rubber, chlorobutyl rubber and bromobutyl rubber wherein the resulting acrylonitrile content in the rubber blend of (A) and (B) (i) is in the range of about 20 to about 40 weight percent and in the rubber blend of (A) and B (ii) is in the range of about 5 to about 25 weight percent and wherein said innerliner is first constructed as an innersurface of an uncured rubber tire as an uncured compounded rubber gum strip having a thickness in the range of about 0.08 to about 0.2 centimeters and is then co-cured with the tire during a tire curing operation.

2. The tire of claim 1 wherein the acrylonitrile/butadiene ratio is in the range of about 55/45 to about 30/70.

3. The tire of claim 2 where said additional rubber is comprised of at least one rubber selected from the group consisting of cis 1,4-polyisoprene rubber, styrene/butadiene copolymer rubber, styrene/isoprene/butadiene rubber and cis 1,4-polybutadiene rubber.

4. The tire of claim 2 where said additional rubber is comprised of at least one rubber selected from the group consisting of butyl rubber, chlorobutyl rubber and bromobutyl rubber.

5. The tire of claim 1 where said additional rubber is comprised of at least one rubber selected from the group consisting of butyl rubber, chlorobutyl rubber and bromobutyl rubber and where the acrylonitrile content in the rubber blend is in the range of about 5 to about 25 weight percent.